June 30, 1936.  C. M. WERT  2,046,282
DUAL RATIO MECHANISM FOR AUTOMOBILES
Filed March 15, 1935  3 Sheets—Sheet 1

Charles M. Wert.
INVENTOR

BY Milburn and Milburn
ATTORNEYS

Charles M. Wert.
INVENTOR

June 30, 1936.  C. M. WERT  2,046,282
DUAL RATIO MECHANISM FOR AUTOMOBILES
Filed March 15, 1935   3 Sheets-Sheet 3

Charles M. Wert.
INVENTOR

BY Milburg and Milburg
ATTORNEYS

Patented June 30, 1936

2,046,282

UNITED STATES PATENT OFFICE 2,046,282

DUAL RATIO MECHANISM FOR AUTOMOBILES

Charles M. Wert, Cleveland, Ohio, assignor of one-third to Frank F. Petznick, Cleveland Heights, Ohio, and one-third to Clarence H. Dray, Lakewood, Ohio Application March 15, 1935, Serial No. 11,360

5 Claims. (Cl. 74—314)

This invention relates to a dual ratio or two-speed mechanism of that type associated with the axle assembly or transmission of a motor-driven vehicle, and is an improvement upon my Patent No. 1,918,200, July 11, 1933.

It is to be understood that with the present invention, the conventional transmission may be employed for establishing gear ratios between the propulsion motor and drive shaft, the purpose of this invention being to provide means whereby any given ratio thus established can be modified or the driving force transmitted to the driven axles of the vehicle wheels without any modification.

The present invention contemplates also the possibility of disconnecting the drive shaft from the driven axles of the vehicle wheels, independently of the regular clutch and conventional transmission.

The object of my invention is to devise a simpler, more compact and extremely durable and dependable two-speed power transmission mechanism, said mechanism, as herein illustrated, being associated with a differential mechanism as a unitary device, although my invention can be embodied in connection with the regular transmission of an automobile.

A more specific object of my invention, as herein disclosed, is to provide a unitary assembly of a differential mechanism and a speed-modifying mechanism comprising an internal gear and an external gear with a supporting member rotatably mounted in an enclosing driving casing and affording an eccentric bearing for a compound internal-external idler gear which cooperates with the speed-modifying internal and external gears in transmitting different speeds to the mechanism, through the manipulation of suitable control means, so as to thereby transmit different speeds to the axle shafts of the vehicle wheels.

A further object consists in devising such a mechanism in which there is provided a control means comprising companion clutch members upon the hub portion of the supporting member and also upon the driving casing and upon the stationary axle housing, as a means of obtaining either normal or modified speeds, or for entirely disconnecting the driven axles of the vehicle wheels from the drive shaft.

My invention further aims to provide a means whereby the lubricating compound, as it is thrown by centrifugal force from a large ring gear to certain portions of the housing, will be conveyed thence by gravity along a directing channel to a point in the region of the axis of rotation where it is picked up and drawn by centripetal force through a restricted annular throat provided between a suitably formed ring and a suitably formed companion part provided upon the driving casing, and thence through openings in said driving casing.

My invention comprehends also certain designing and refinement of parts that are peculiar to the present combination and that are advantageous from the standpoint of simplified manufacture and servicing, all of which will be hereinafter described.

Other objects will appear from the following description and claims when considered together with the accompanying drawings.

It is to be understood also that the present form of disclosure is merely for purposes of illustration and that various other modifications may be effected without departing from the spirit of the present invention as herein set forth and claimed.

Figure 1:
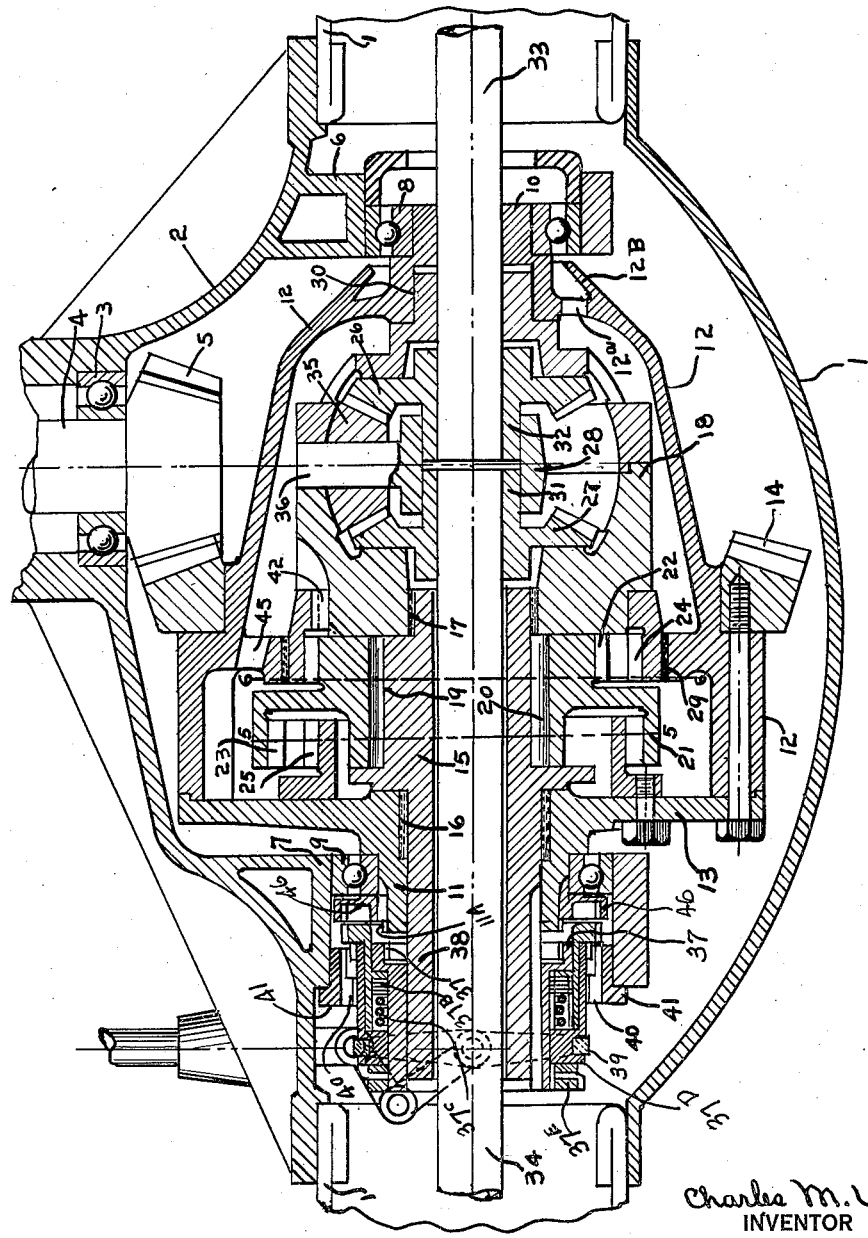
Fig. 1 is a horizontal sectional view of my improved mechanism.
Figure 2:
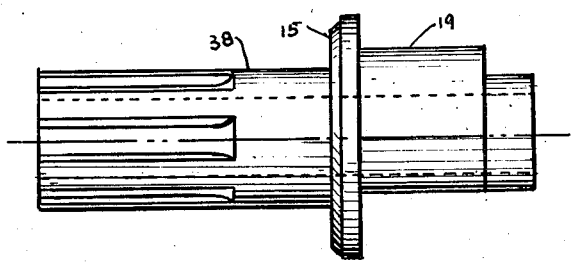
Fig. 2 is a view of the supporting member showing concentric and eccentric bearing surfaces.

The axle housing 1 has a middle portion thereof provided with a detachable plate 2 which has a bearing structure 3 for the support of the drive shaft 4 on which is fixedly mounted a small driving pinion 5. The detachable plate 2 is provided with supports 6 and 7 for the oppositely disposed anti-frictional bearings 8 and 9 which are suitably retained within said supports. Within the anti-frictional bearings 8 and 9 are journaled the co-axially disposed hubs 10 and 11 of the parts 12 and 13 respectively, which are bolted together so as to form a driving casing provided with annularly arranged openings 12ª in one end thereof. Integral with or attached to the same end thereof is a centripetal ring 12ᵇ with an inwardly extending cone portion surrounding and spaced from the adjacent portion of hub 10. There is also mounted upon the casing 12, the large ring bevel gear 14 meshing with the small bevel driving pinion 5 of the drive shaft 4 and a toothed clutch member 46 is fixedly mounted upon hub portion 11 of driving casing 13.

Bearings 16 and 17 provide a journal for concentrically mounting the supporting member 15 within portion 13 of the driving casing and portion 18 of the differential casing respectively, this supporting member having an eccentric bearing wall 19 upon which is arranged the anti-frictional bearing 20 providing suitable support for a rotatable combination internal-external idler gear 21 with its tooth portions 22 and 23 in constant mesh with the internal gear 24 and external gear 25, respectively.

Internal gear 24 as herein shown is fixedly connected to portion 18 of differential casing and the external gear 25 is bolted concentrically to, or otherwise fixedly connected to portion 13 of the driving casing for under-drive; or the internal gear 24 can be bolted concentrically to or otherwise fixedly connected to portion 13 of the driving casing, and the external gear 25 fixedly connected to portion 18 of differential casing for over-drive.

Bearing portions 29 and 30 form a journal for concentrically supporting differential casing 18 within portion 12 of the driving casing. The differential gears 26 and 27 are journaled within hub portion 28 of the spider by means of their hubs 31 and 32. The gears 26 and 27 are keyed or splined to axle shafts 33 and 34, respectively, and mesh with differential pinions 35 which are rotatably mounted on arm 36 which is rigidly fixed in a suitable hole in the outer wall of differential casing 18. The differential casing 18 is keyed at 42 to a portion of driven gear 24 so as to rotate therewith.

It will be observed that the supporting member 15 is mounted concentrically for rotation about the axis of the driving casing and that the hub of the supporting member 15 extends beyond the hub 11 of the driving casing so as to permit the adjustable clutch member to be splined thereupon, as will now be explained. The supporting member 15 has its other end extended so as to afford the bearing 17 for a part of the differential casing.

I have provided a synchronizing clutch in which a toothed clutch member 37$^A$ is rotatively mounted within the toothed clutch member 37$^D$, said clutch member 37$^D$ being fixedly connected to the toothed clutch member 37. A plurality of interfitting annular clutch plates 37$^B$ are alternately keyed to members 37 and 37$^A$, a coil spring 37$^C$ exerting a predetermined pressure upon said clutch plates by means of retaining nuts 37$^E$. The toothed clutch member 37 is splined or otherwise slidably keyed to hub portion 38 of the supporting member 15 so as to rotate therewith, said clutch member being shiftable back and forth therealong by a conventional yoke 39 which engages in a groove 39$^A$ in the clutch member 37$^D$ and which has suitable connections through detachable plate 2 for manipulation by the operator through other suitable connections.

The shiftable clutch member when shifted in one direction, (to the left as viewed in Fig. 4), is engageable with the so-called clutch member 40 which forms part of the stationary element 41 in the fixed support 7, and when shifted in the other direction, (to the right as viewed in Fig. 4), is engageable with clutch portion 46 and 11$^a$ which forms part of hub portion 11 of the casing 13. This clutch mechanism will be more fully understood from the following description.

Figure 4:
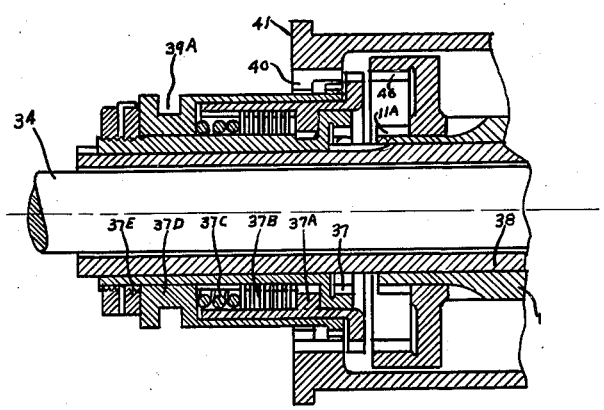
Fig. 4 is a sectional view showing the clutch members.
Figure 5:
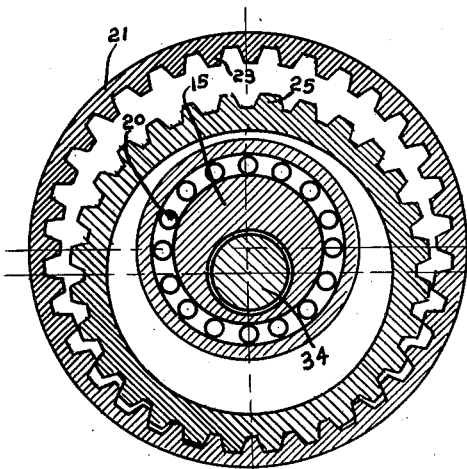
Fig. 5 is a view taken on line 5—5 of Fig. 1.
Figure 6:
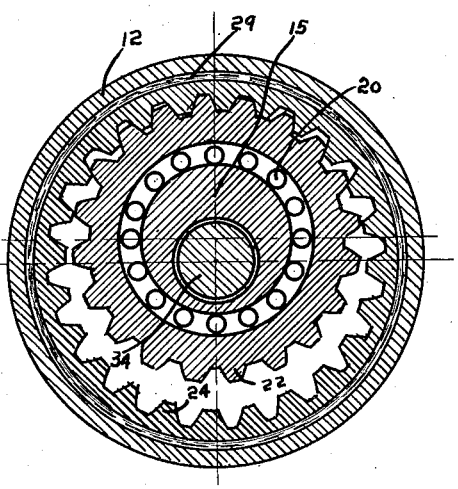
Fig. 6 is a view taken on line 6—6 of Fig. 1.

Referring to Fig. 4, the slidable clutch member composed of toothed clutch members 37—37$^A$ and 37$^D$ with frictional disc plates 37$^B$ and pressure spring 37$^C$, is slidably splined on hub portion 38 of supporting member 15 so as to rotate therewith. Thus, when the slidable clutch is shifted in one direction, (to the right as viewed in Fig. 4), the toothed portion of member 37$^A$ slides into engagement with toothed portion of rotating clutch member 46. At this point, clutch member 37 begins to revolve, due to frictional contact of clutch discs 37$^B$. Thus hub portion 38 of supporting member 15 and clutch member 37 approaches synchronization with clutch member 11$^A$ thus enabling positive clutch member 37 to come into full engagement with clutch member 11$^A$ noiselessly; and when the slidable clutch is shifted in the opposite direction (to the left as viewed in Fig. 4), synchronization is obtained through the toothed portion of 37$^A$ first contacting with toothed portion of stationary clutch 41, and the toothed portions of positive clutch member 37$^D$ then sliding into engagement with the toothed portions 40 of stationary clutch member 41.

In the accompanying illustration, the speed-modifying mechanism is in what might be called neutral position; that is, the clutch members are out of engagement. Therefore, the driving casing 12—13 and the large headgear 14 may be rotated by the drive pinion 5 without imparting any rotation whatever to the axle shafts 33 and 34.

To obtain transmission of one speed to the axle shafts 33 and 34, for instance, what might be referred to as normal speed, the slidable clutch member is shifted into engagement with clutch members 46 and 11$^A$. With these clutch members thus engaged, all mechanism within the driving casing 12—13 will revolve as a unit with the driving casing 12—13 and the large bevel gear 14, thus transmitting to axle shafts 33 and 34 the unmodified or normal rate of speed of the drive shaft 4 through driving pinion 5 and large bevel gear 14. The rate of speed referred to as "normal" is that speed corresponding to any given ratio in the regular transmission. During this operation, the supporting member 15 and internal-external gear 21 do not rotate about their own axes but merely revolve as a unit.

In order to transmit to the axle shafts 33 and 34 a modified rate of speed of that corresponding to the gear ratio of the regular transmission at any given time, the slidable clutch member is shifted into engagement with the stationary portion 40, whereupon the supporting member 15 will be held stationary. When the supporting member 15 is thus held stationary and the driving casing 12—13 is rotated through its driving connections from drive shaft 4, the speed-modifying driving gear 25 is carried in the same direction of rotation as bevel gear 14, thereby causing rotation of the combination internal-external idler gear 21 which is journaled on an eccentrically formed bearing portion 19 of the supporting member 15. The combination internal-external idler gear 21 being always in mesh with speed-modifying gears 24 and 25, will cause rotation of the differential in the same direction as outer driving casing 12—13, at a modified rate of speed; and consequently, there will be transmitted a correspondingly modified rotation of speed to axle shafts 33 and 34 through the keyed portion 42 of speed-modifying driven gear 24 and thence through differential casing 18, arm 36, differential pinions 35, and differential gears 26 and 27.

The mechanism heretofore described will of course be operable also in connection with the reverse gear combination of the regular transmission, as will be readily understood.

Figure 3:
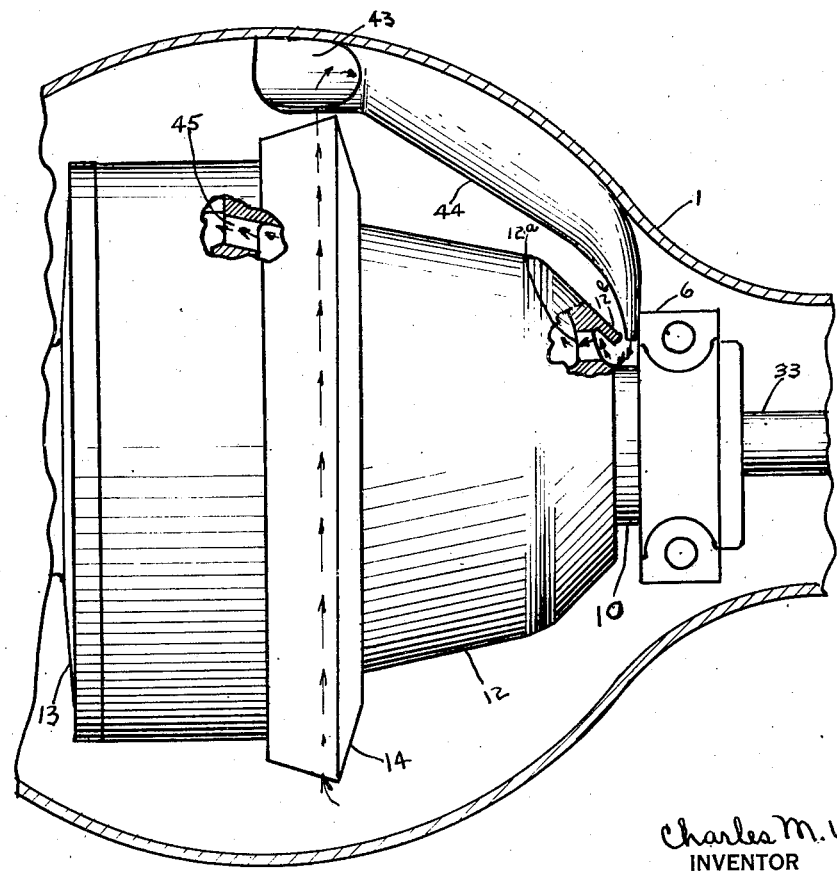
Fig. 3 is a view indicating the manner of distributing the lubricant.

The special lubricating means for this mechanism will now be described. The large bevel gear 14 rotating at any speed, carries with it a portion of the lubricating compound in the axle housing 1 and a part of this lubricant will be thrown by centrifugal force from this gear into the enlarged open end 43 of the inclined and tapered conveying channel 44 which is provided at the top of housing 1. The opening 43 is cut back in an inclined manner upon the near side so as to facilitate the entrance of the lubricant which will be impinged against the inner surface of the far side of the channel member. This lubricant flows by gravity through the channel 44 and out at the smaller end thereof and upon the hub portion 10 of driving casing 12. The lubricant is thence drawn by centripetal force through the passage provided between the hub portion 10 and the cone-shaped centripetal ring 12b so as to pass through annularly arranged openings 12a to the inside of driving casing 12 and thence to the speed-modifying mechanism through openings 45 which are provided through a wall portion within casing 12. The path taken by this lubricant is graphically portrayed by arrow lines in Fig. 3 of the accompanying drawings.

Among the distinguishing characteristics of the present combination I attach considerable importance to the fact that the single supporting member 15 is rotatably mounted concentrically within the driving casing 12 and within a portion of differential casing 18 and affords an eccentric bearing surface whereon the combination internal-external idler gear 21 is rotatably mounted.

The combination internal-external idler gear 21 is so located that it will always be in mesh with the other speed-modifying gears 24 and 25.

Another distinguishing characteristic is the fact that the internal and external gears may have either straight spur teeth or helical teeth. It is the combination of this simple form of mechanism with the differential mechanism that makes possible the present invention with its marked advantages.

The present combination is comparatively simple in construction and yet extremely dependable and efficient, thus being comparatively inexpensive from the standpoint of manufacture as well as that of wear or replacement of parts.

In my present improved combination and arrangement of speed-modifying gears, only one anti-friction bearing is required, that is the bearing 20 for the internal-external idler gear 21.

The particular system of automatic lubrication constitutes another feature of novelty and contributes to the life and efficiency of the mechanism.

Thus, I have accomplished an efficient unitary assembly of mechanism comprising a combination of the differential mechanism and a simple and efficient speed-modifying means by which the axles may be driven at a modified rate of speed as compared to the normal or unmodified speed. It is to be understood that the modified rate of speed referred to is either a reduced rate of speed as compared with the normal or unmodified speed, or an increased rate of speed as compared to the normal or unmodified rate of speed. Both of these arrangements are to be understood as being comprehended by the following claims.

What I claim is:

1. In a speed-modifying mechanism, a driving casing, a drive shaft having suitable connection with said casing for rotating the same, axle shafts of the vehicle wheels extending thereinto, said axle shafts operatively connected to a pair of differential gears, a differential casing journalled within said driving casing, differential pinions and an arm therefor serving to connect said differential gears to said differential casing, speed-modifying internal and external gears located to one side of said differential casing and within said driving casing, one of said speed-modifying gears being fixedly connected to said driving casing, and the other of said speed-modifying gears being fixedly connected to said differential casing, a single supporting member having an external eccentric bearing portion, and having a concentric bearing portion on one side of the eccentric bearing portion for engagement with said driving casing and a concentric extended hub portion upon the opposite side of the eccentric bearing portion for engagement with said differential casing, a combination internal-external idler gear journaled upon said eccentric bearing portion of said supporting member and being in mesh with both of the said speed-modifying gears, a clutch means adapted to connect said supporting member to said driving casing for normal speed, and a stationary part into engagement with which said supporting member may be operatively engaged by manipulation of said clutch means for the production of modified speed.

2. In a speed-modifying mechanism, a driving casing, a drive shaft having suitable connection with said casing for rotating the same, axle shafts of the vehicle wheels extending thereinto, said axle shafts operatively connected to a pair of differential gears, a differential casing journaled within said driving casing, differential pinions and an arm therefor serving to connect said differential gears to said differential casing, speed-modifying internal and external gears located to one side of said differential casing and within said driving casing, one of said speed-modifying gears being fixedly connected to said driving casing, and the other of said speed-modifying gears being fixedly connected to said differential casing, a single supporting member concentrically journaled within said driving casing and said differential casing and having an external eccentric bearing portion and a concentric bearing portion on one side of said eccentric bearing portion for engagement with said driving casing and an extended concentric hub portion upon the opposite side of said eccentric bearing portion for engagement with said differential casing, a combination internal-external idler gear journaled on the eccentric bearing portion of said supporting member and being in mesh with both said speed-modifying internal and external gears, a clutch means adapted to connect said supporting member to said driving casing for normal speed, and a stationary part in engagement with which said supporting member may be operatively engaged by manipulation of said clutch means for the production of modified speed, the engageable clutch member of said clutch means being slidably mounted along the axis of said supporting member and being adapted for rotation therewith.

3. In a speed-modifying mechanism for a motor driven vehicle, the combination of a differential mechanism having drive connections with the axles of the vehicle wheels, a driving casing, speed-modifying gears arranged operatively between said driving casing and said differential mechanism, said gears including an intermediate combination speed-modifying internal-external gear, and internal and external gears in constant mesh therewith, one of said speed-modifying gears being fixedly connected to said driving casing, the other of said speed-modifying gears being fixedly connected to said differential casing, a single supporting member having external bearing portions arranged eccentrically for said combination internal-external idler gear and concentrically for journaling within said driving casing and said differential casing respectively, said concentric bearing portions being upon opposite sides of said eccentric bearing portion, and means for controlling the effective operation of said gears.

4. In a speed-modifying mechanism for a motor-driven vehicle, a driving casing, a drive shaft having suitable connection with said casing for rotating the same, axle shafts extending thereinto, said axle shafts operatively connected to a pair of differential gears, hub portions of said differential gears journaled within the hub portion of a spider, differential pinions journaled on arms of said spider and serving therewith to connect said differential gears to said differential casing, speed-modifying mechanism including internal and external gears, said internal gear being fixedly connected to said differential casing, said external gear being fixedly connected to said driving casing, mechanism for establishing operative drive connections between said speed modifying gears, said mechanism including an internal-external idler gear meshing with said internal and external gears, and means for rendering said speed-modifying mechanism active or inactive so that the vehicle wheels may be operated at either normal or modified speed.

5. In a speed-modifying mechanism for a motor driven vehicle, the combination of a differential mechanism having drive connections with the axles of the vehicle wheels, a drive shaft, a driving casing, speed-modifying gears arranged operatively between said drive shaft and differential mechanism, said gears including a combination internal-external idler gear and an internal gear and an external gear meshing therewith and adapted to effect a modification in speed transmitted to the axles of the vehicle wheels, a single supporting member having a bearing portion for said internal-external gear, said bearing portion being arranged eccentrically with respect to the axis of the differential mechanism, said supporting member having concentric bearing portions upon opposite sides of said eccentric bearing portion for engagement with said driving casing and differential mechanism, respectively, said internal gear being connected with the differential mechanism for operation thereof, and said external gear being connected with the drive shaft, and means whereby said speed modifying mechanism may be rendered active or inactive so that the vehicle wheels may be operated at either normal or modified speed.

CHARLES M. WERT.

CERTIFICATE OF CORRECTION.

Patent No. 2,046,282.   June 30, 1936.

CHARLES M. WERT.

It is hereby certified that error appears in the printed specification of the above numbered patent requiring correction as follows: Page 4, first column, line 8, claim 3, strike out the hyphenated word "speed-modifying" and insert the same before "internal" in line 9, same claim; and that the said Letters Patent should be read with this correction therein that the same may conform to the record of the case in the Patent Office.

Signed and sealed this 15th day of September, A. D. 1936.

Henry Van Arsdale (Seal)

Acting Commissioner of Patents